(12) United States Patent
Küpper et al.

(10) Patent No.: US 6,612,416 B2
(45) Date of Patent: Sep. 2, 2003

(54) MOTOR VEHICLE WITH AN AUTOMATED TORQUE-TRANSFER SYSTEM

(75) Inventors: Klaus Küpper, Bühl (DE); Markus Kneissler, Bühlertal (DE); Klaus Henneberger, Bühl (DE); Jens Schnäbele, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/017,477

(22) Filed: Dec. 14, 2001

(65) Prior Publication Data
US 2002/0074207 A1 Jun. 20, 2002

(30) Foreign Application Priority Data
Dec. 14, 2000 (DE) .......................................... 100 62 498

(51) Int. Cl.[7] ............................................. B60K 41/26
(52) U.S. Cl. ...................................... 192/220; 180/246
(58) Field of Search ........................ 477/166; 192/3.63, 192/4 A, 84.6, 220; 74/335, 473.12; 303/122; 180/246

(56) References Cited

U.S. PATENT DOCUMENTS

| | | | | |
|---|---|---|---|---|
| 5,632,706 A | * | 5/1997 | Kremmling et al. | 477/74 |
| 5,928,110 A | * | 7/1999 | Vornehm et al. | 477/166 |
| 6,327,927 B1 | * | 12/2001 | Rogg et al. | 74/335 |
| 6,386,351 B1 | * | 5/2002 | Salecker et al. | 192/54.1 |
| 2002/0084129 A1 | * | 7/2002 | Fritzer et al. | 180/246 |
| 2002/0088681 A1 | * | 7/2002 | Berger et al. | 192/3.63 |

\* cited by examiner

Primary Examiner—Christopher P. Schwartz
(74) Attorney, Agent, or Firm—Darby & Darby

(57) ABSTRACT

A motor vehicle has an automated clutch (2) and/or an automated transmission (3) that are operated by an actuator (11, 8) through control commands of a control device (7). At least some of the control commands depend on sensor input indicating whether or not the brakes of the motor vehicle are applied. To detect the actuation of the brakes, the motor vehicle uses two brake sensors or switches (71, 72) rather than only one, thereby providing an additional margin of safety in the operation of the vehicle.

13 Claims, 1 Drawing Sheet

MOTOR VEHICLE WITH AN AUTOMATED TORQUE-TRANSFER SYSTEM

BACKGROUND OF THE INVENTION

The invention relates to a motor vehicle with an automated actuator device for a clutch and/or a transmission in the power train. The invention further relates to a method of controlling an actuator device of an automated clutch and/or an automated transmission. The automated clutch and/or automated transmission are collectively referred to as an automated torque-transfer system.

Motor vehicles and actuating devices of the kind that this invention relates to are known from DE 195 04 847, DE 44 26 260, and DE 197 34 023.

In the type of motor vehicles meeting the foregoing description it is of critical importance to reliably detect when the brakes are being applied, because the way in which different control processes are performed depends on the ability to reliably detect an application of the brakes. For example, failing to detect an application of the brakes because of a defective cable or another defective condition, or detecting an application of the brakes when in fact the brakes are not being applied can make the vehicle unsafe or entirely unfit to use, or can lead to dangerous situations.

OBJECT OF THE INVENTION

In view of the foregoing background, the invention therefore has the objective of offering an improvement over the state of the art by providing a motor vehicle with a higher margin of safety or a safety reserve in regard to the correct operation of a control process that depends on whether or not the brakes are applied.

SUMMARY OF THE INVENTION

The present invention meets the foregoing objective in a vehicle that has at least one actuator for the clutch and/or the transmission and a control device directing the operation of the actuator through control signals. The vehicle is further equipped with a brake-actuating device such as a pedal or a hand-operated lever. According to the invention, the vehicle has two sensors or switches to monitor the actuation of the brake. Dependent on the signals of one or both of the brake sensors, the control device generates a control signal or control command to the actuator to thereby control the operation of the clutch and/or the transmission.

It is advantageous if the control unit generates a control signal if both brake sensors are signaling an actuation of a brake.

According to a concept of the invention, it can be useful if the control unit generates a control signal if both brake sensors indicate that the brake is not actuated.

It is useful according to the invention, if a control signal is generated in a situation where one of the two brake sensors is signaling an actuation of a brake. In this case, the sensor signal that causes the control signal can come either from the first sensor responding to the brake actuation or the second sensor responding to the brake actuation.

It is also useful, if a control signal is generated in a situation where one of the two brake sensors sends a signal indicating that the brake is not being actuated. In this case, the signal indicating absence of actuation which causes the control signal can come either from the first sensor responding to the absence of actuation or the second sensor responding to the absence of actuation.

A further practical concept of the invention is to use the on- or off-condition of at least one switch to detect an actuation of the brakes and to generate a control signal depending on the condition of the switch.

It is advantageous according to the invention, if the control unit cannot initiate an engine start or send a release signal allowing the engine to be started unless there is signal indicating that the brakes are applied. It can be useful if the engine is allowed to start after the clutch has first been automatically disengaged or if the clutch is already in a disengaged condition. In addition or as an alternative, it can be useful to allow the engine to start only after the transmission has first been automatically shifted into the neutral position or if it is already in the neutral position.

According to a further concept of the invention, it is useful if a crawl movement of the vehicle is allowed only if there is a signal that at least one of the brakes or all of the brakes are in a non-actuated condition. The term "crawl movement" means that the vehicle is moving very slowly without actuating the gas pedal, with the transmission in gear, and with a controlled degree of clutch engagement.

According to a further concept of the invention, it is useful if the control unit generates a signal indicating a locked condition of one or more wheels only if there is a signal indicating a wheel-rpm rate of substantially zero coinciding with a signal indicating that the brakes are applied.

It is advantageous if the correct functioning of the two switches is monitored and if the control unit generates an error signal and starts an emergency program in a case where the switch that should respond first is giving no signal of an actuation, but the second switch is indicating that the brakes are actuated.

It is also particularly useful if the correct functioning of the two switches is monitored and if the control unit generates an error signal and starts an emergency program in a case where the switch that should respond first is indicating an actuation of the brake, but the second switch is giving no signal of an actuation.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

Embodiments of the invention are described below as examples only, and no limitations are thereby implied. The description refers to the attached drawings, wherein.

DETAILED DESCRIPTION OF THE INVENTION

Figure 1:
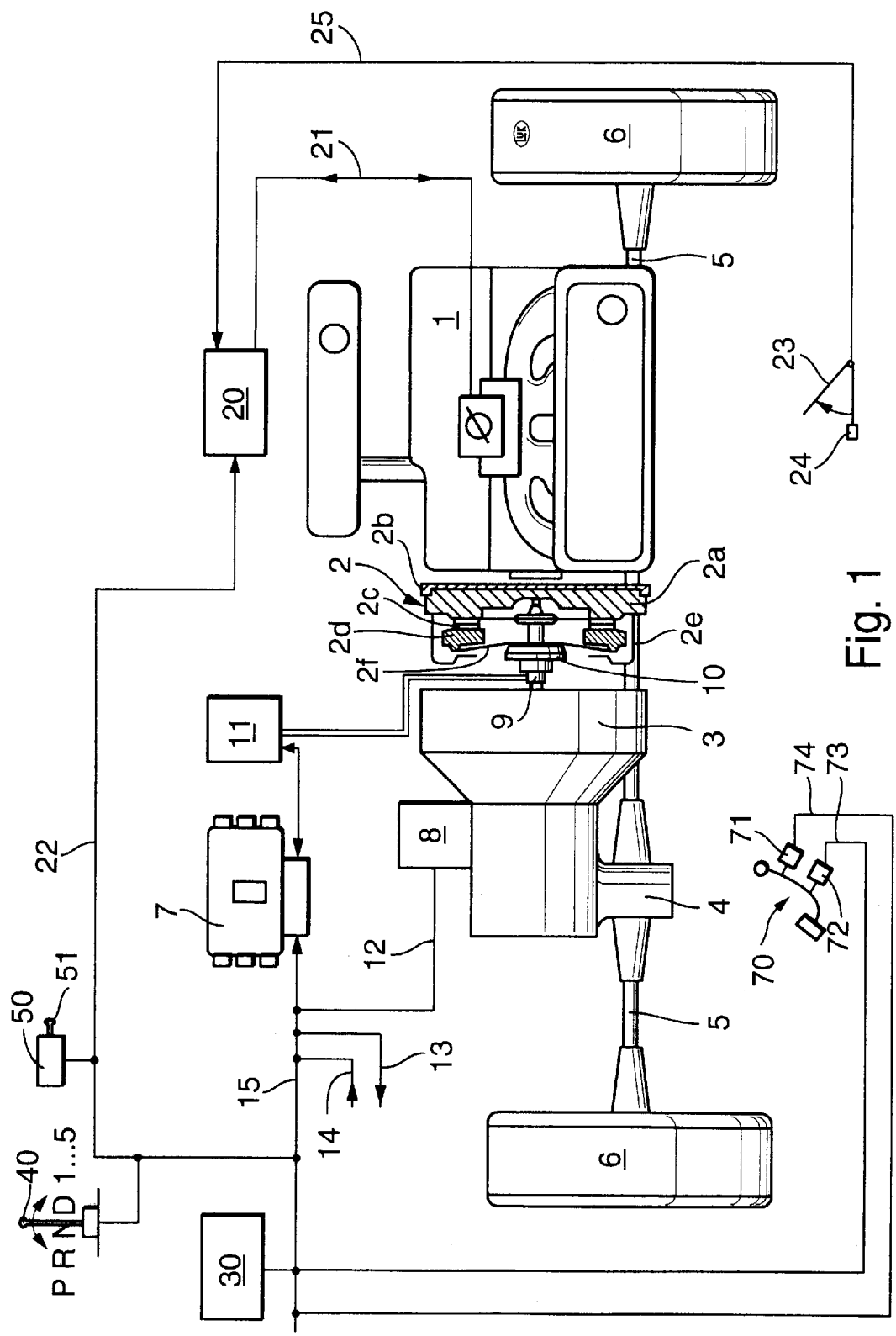
FIG. 1 represents a schematic view of a motor vehicle.

FIG. 1 gives a schematic view of a motor vehicle with a power train containing an engine 1, a clutch 2, and a transmission 3. Further shown in the drawing are a differential 4, drive axles 5, and wheels 6 that are driven by the drive axles. There can be rpm sensors arranged at the wheels to detect the rates of rotation of the wheels. The wheel-rpm sensors serve to detect or calculate the input rpm rate of the transmission. In case of a sensor failure, or if the sensor signals are otherwise unavailable, the control unit can switch to an emergency mode of operation. The case where all signals are available and have no errors represents the normal operating mode. The wheel rpm sensors can also be functionally associated with other electronic units such as an anti-lock braking system (ABS). Based on at least one wheel rpm rate, the control unit 7 can determine a vehicle speed and/or a transmission rpm rate. The engine 1 can also be configured as a hybrid drive unit with, e.g., an electric motor, a flywheel with a free-wheeling clutch and a combustion engine. The clutch 2 is configured as a friction clutch, including special types such as a magnet-powder clutch, multi-disc clutch, a torque converter with a lock-up clutch, and other clutches. The friction clutch can also be a wear-compensating, self-adjusting clutch.

The device for the automated actuation of a transmission 3 has a control unit 7 and an actuator 8 that is controlled by the control unit 7. The control unit 7 can also control an actuator 11 for the automated operation of the clutch 2. The control unit 7 and the schematically represented actuators 8 and 11 can be seen in the drawing. The control unit 7 can be configured as an integrated control unit that performs the control or regulation of the clutch, the transmission, and possibly other components of the power train. An electronic control of the engine can also be integrated in the control unit. The control of the clutch and the transmission or, more specifically, the control of the clutch actuator 11 and the transmission actuator 8, could also be performed by different control units. It is also possible that the control units for the clutch, transmission and/or engine are arranged separately and communicate through data lines or signal lines with each other. The control units or electronic units are connected to sensors to receive signals representing the current values of operating parameters which, in their entirety, are referred to as the current operating point of the vehicle. It is also possible that the control unit receives all of the required information through data lines or a data bus such as, e.g., a CAN bus (Central Area Network bus).

The control unit 7 is equipped with a computer unit to receive, process, store, retrieve and transmit the signals and system data. The control unit further generates control variables and/or control signals that are used to direct the operation of actuators or are forwarded to other electronic units.

The clutch 2 is mounted on or connected to a flywheel 2a. The flywheel can be an integral flywheel or it can be a dual-mass flywheel with a primary mass and a secondary mass and a damping device to attenuate rotary oscillations between the primary and secondary mass. The flywheel 2a can further carry a starter on the outer circumference. The clutch has a clutch disc 2c with friction linings and a pressure plate 2d as well as a clutch cover 2e and a diaphragm spring 2f. If the clutch is a self-adjusting clutch, it will in addition have means to adjust the clutch and to advance the wear-compensation device. A sensor, such as a force-, displacement-, or angle sensor is provided to detect a condition when a clutch adjustment is necessary, e.g., because of wear.

The clutch is operated by means of a release device 9, e.g., with a release bearing 10. The control unit 7 directs the actuator 11 for the actuation of the clutch. The release device can be actuated, e.g., directly by an electric motor, or indirectly by an electric motor with a hydraulic transfer link between the motor and the release device, or by an entirely hydraulic principle, or by any other appropriate actuating mechanism. The release device 9 with the release bearing 10 can be configured as a slave cylinder arranged concentrically with the transmission input shaft and cooperating with the release bearing or a comparable element.

The actuator 8 has at least one output element or operating element to perform the functions of selecting and/or shifting in the transmission 3. The way in which the selector- and/or shift actuation is performed depends on the type of transmission.

Of particular interest are transmissions with a central actuating shaft in which shifting and selecting operations are performed by axial and rotary movements of the central actuating shaft. For example, an actuator may have one operating element to move the central actuating shaft in the axial direction and another operating element for the circumferential direction. In this kind of arrangement, the shifting operation may be associated with the circumferential direction and the selector operation with the axial direction, or vice versa.

Also of interest are transmissions with separate actuating shafts for the selecting operation and for the shifting operation, with both shafts being actuated in the circumferential direction to perform the steps of selecting a shift track and shifting into a gear.

Further of interest are transmissions with shifting rods, in which the shifting rods are actuated in their axial directions to shift into a gear. The selecting step in this arrangement is performed by selecting the appropriate shifting rod.

The shafts or shifting rods represent internal shifter elements of the transmission, or the shafts are arranged to act on internal shifter elements. The actuator 8 acts on internal shifter elements for engaging, disengaging or changing of gears or ratio levels either directly or indirectly through one central shifter shaft, an arrangement of several shafts, or through shifting rods.

The control unit 7 is connected through a signal line 12 to the actuator 8, so that control signals and/or sensor signals concerning the operating state can be exchanged, transmitted or interrogated. In addition, signal lines 13 and 14 are available, through which the control unit is communicating with additional sensors or electronic units at least during part of the time. Examples of electronic units connected into this system are the electronic control module of the engine, an electronic module for the anti-lock braking system, or an electronic module for an anti-slip regulation system. Among the additional sensors are those that characterize or detect the operating state of the vehicle in general, for example rpm sensors of the engine or of the wheels, sensors for the throttle valve position, for the gas pedal position, or other sensors. The signal connection 15 provides a communication line to a data bus, such as a CAN bus, by which system data of the vehicle or of other electronic units can be made available, given that the electronic units are as a rule networked under the control of computers.

A gear shift in an automated transmission can be initiated by the driver, for example by giving a command for up-shifting or down-shifting through a switch, a touch key, or another gear-selecting device 40. There could also be a signal for selecting the next-following gear to be engaged. Analogously, the signal for shifting gears can also be entered through an electronic device.

With a different operating program, the actuation of the transmission can be performed automatically, so that the gear is selected and the shift process is initiated on the basis of current values of operating parameters. An automated transmission can perform a gear shift at certain predetermined points without operator input, based on sensor signals and by means of characteristic values, characteristic curves or curve fields.

Furthermore, the transmission can be set to a neutral position, where no drive connection exists between the input and output shafts of the transmission. It is further possible to select a parking position, in which the power train is locked up. The parking position can also be automatically selected, for example at the time when the ignition key 51 is pulled out of the ignition lock, if the operating condition of the vehicle is compatible with locking the power train. For example, if the ignition key is taken out while the vehicle is moving, the transmission cannot be allowed to automatically shift into the parking position.

The selector element 40 of the transmission, such as a selector or shift lever, can be set to a position M that allows the driver to select gears manually, a position D for selecting gears automatically while the vehicle is moving, a position P to lock the transmission, and a neutral position N. If the vehicle is equipped with an automated clutch and a manual transmission, the shift lever has to be moved manually into the different gear positions.

Preferably, the vehicle is equipped with a so-called electronic gas pedal 23. The position of the gas pedal 23 is picked up by a sensor 24 that communicates with the electronic engine control unit 20. Based on input from the sensor 24, the electronic engine control unit 20 regulates the supply of fuel, the ignition timing or the fuel-injection timing, or the throttle-valve position by way of the signal connection 21 of the engine. The electronic gas pedal 23 with the sensor 24 is connected to the electronic engine control unit 20 by way of the signal connection 22. The transmission can have an electronic transmission control unit 30 with signal connections to the control units 7 and 20. It is practical to have an electric motor set the position of the throttle valve. A direct mechanical connection from the gas pedal to the throttle valve is no longer necessary nor practical in power train systems of this kind.

The vehicle is further equipped with an engine starter device 50 which, based on the driver's input, for example by inserting and turning the ignition key 51, activates an electronic engine control module and a starter motor to start the engine.

FIG. 1 further shows a brake-actuating element 70 such as a pedal or a hand-operated lever. Two brake sensors 71 and 72 are arranged to detect the state of the brake-actuating element 70 and provide a preferably digital signal by taking on a binary value of 1 when the brake is actuated and a value of 0 when it is not actuated, or vice versa. Thus with a beginning actuation, there will be a change from the non-actuated to the actuated condition.

The brake sensors 71 and 72 are preferably connected to the control unit by way of the signal connections 73 and 74. In one embodiment of the invention, the brake sensors are arranged so that they are triggered sequentially with a time lag from one to the other, or dependent on the amount of actuator travel. In this case, the control unit can interpret the sequence in which the switches turn on or off and use the information to generate a control signal.

The control signals from the two brake sensors 71 and 72 are used for example in a manner where the control system monitors whether both brake sensors or switches are responding or whether there is a response from one or the other or neither of the brake sensors.

According to the invention, an engine start can be initiated or a signal to allow the engine to start can be issued if both brake sensors are signaling that the brakes are actuated. In this case the engine control unit would initiate an engine start if the control unit of the automated clutch issues a release signal that allows the engine to be started. In practice, this means that the engine can be started after the clutch has been disengaged automatically based on a signal from the control unit, or if it is already in a disengaged condition and/or after the transmission has been shifted into the neutral position or is already in the neutral position.

According to another aspect of the invention, it is practical if a crawl movement of the vehicle is allowed only if there is a signal that at least one of the brakes or all of the brakes are in a non-actuated condition. The term "crawl movement" means that the vehicle is moving very slowly without actuating the gas pedal, with the transmission in gear, and with a controlled degree of clutch engagement. Advantageously, the condition for allowing a crawl movement is for both of the brake sensors to indicate that the brakes are not applied.

According to a further aspect of the invention, it is useful if the control unit generates a signal indicating a locked condition of one or more wheels only if there is a signal indicating a wheel-rpm rate of substantially zero coinciding with a signal indicating that the brakes are applied. Advantageously, the condition for the control unit to accept and act on the lock-up signal is that both of the sensors indicate an applied condition of the brakes.

It is advantageous if the correct functioning of the two switches is monitored and if the control unit generates an error signal and starts an emergency program in a case where the switch that should respond first is giving no signal of an actuation, but the second switch is indicating that the brakes are actuated.

It is also particularly useful if the correct functioning of the two switches is monitored and if the control unit generates an error signal and starts an emergency program in a case where the switch that should respond first is indicating an actuation of the brake, but the second switch is giving no signal of an actuation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A motor vehicle comprising:
   a power train with an engine and a torque-transfer system that comprises at least one of an automated clutch and an automated transmission;
   at least one actuator operable to actuate the torque-transfer system;
   a control device operable to control the at least one actuator;
   a brake;
   a brake-actuating device operable to apply the brake;
   two brake sensors, each of the two brake sensors being independently operable to monitor the brake-actuating device, and each of the two brake sensors providing its own brake-sensor signal to the control device indicating whether or pot the brake is applied;
   wherein the control device generates an actuator-control signal depending on the brake-sensor signals and thereby directs an activity of the at least one actuator depending on the brake-sensor signals.

2. The motor vehicle of claim 1, wherein the control device generates the actuator-control signal if both of the brake-sensor signals indicate that the brake is applied.

3. The motor vehicle of claim 1, wherein the control device generates the actuator-control signal if both of the brake-sensor signals indicate that the brake is not applied.

4. The motor vehicle of claim 1, wherein the control device generates the actuator-control signal if one of the two brake-sensor signals indicates that the brake is applied.

5. The motor vehicle of claim 1, wherein the control device generates the actuator-control signal if one of the two brake-sensor signals indicates that the brake is not applied.

6. The motor vehicle of claim 1, wherein the brake sensors comprise switches and the brake-sensor signals comprise binary signals.

7. The motor vehicle of claim 6, wherein the switches comprise a first switch and a second switch that are triggered sequentially, and wherein the control device generates an error signal and starts an emergency program if the second switch indicates that the brake is applied while the first switch indicates that the brake is not applied.

8. The motor vehicle of claim 6, wherein the switches comprise a first switch and a second switch that are triggered sequentially, and wherein the control device generates an error signal and starts an emergency program if the first switch indicates that the brake is applied while the second switch continues to indicate that the brake is not applied.

9. The motor vehicle of claim 1, wherein the control device is further operable to generate an engine-control signal causing the engine to be started or canceling a flag that prevents the engine from being started, and wherein the control device is prevented from generating said engine-control signal, unless at least one of the brake-sensor signals indicates that the brake is applied.

10. The motor vehicle of claim 9, wherein the torque transfer system comprises the automated clutch, and wherein the control device is further prevented from generating said engine-control signal unless and until the automated clutch is in a disengaged condition.

11. The motor vehicle of claim 9, wherein the torque transfer system comprises the automated transmission, and wherein the control device is further prevented from generating said engine-control signal unless and until the automated transmission is in a neutral position.

12. The motor vehicle of claim 1, further comprising a gas pedal; wherein the motor vehicle is capable of a crawl-speed movement during which the gas pedal is not applied, the automated transmission has a gear engaged, and the automated clutch has a controlled degree of clutch engagement; and wherein the control device generates a signal blocking said crawl-speed movement, unless at least one of the brake-sensor signals indicates that the brake is not applied.

13. The motor vehicle of claim 1, wherein the vehicle further comprises wheels turning at a wheel-rpm rate and means for detecting the wheel-rpm rate, and wherein the control device generates a locked-wheel signal indicative of a locked condition of at least one of the wheels if the wheel-rpm rate of at least one of the wheels is detected to be substantially zero and if at the same time at least one of the two brake-sensor signals indicates that the brake is applied.

* * * * *